（12）United States Patent
Kemmerer et al.

(10) Patent No.: US 10,058,035 B2
(45) Date of Patent: Aug. 28, 2018

(54) THRESHING AND SEPARATING SYSTEM WITH ADJUSTABLE ROTOR VANES

(71) Applicant: CNH Industrial America LLC, New Holland, PA (US)

(72) Inventors: Benjamin Kemmerer, New Holland, PA (US); Wayne T. Flickinger, Oxford, PA (US); Jonathan E. Ricketts, Coal Valley, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/378,446

(22) Filed: Dec. 14, 2016

(65) Prior Publication Data

US 2018/0160627 A1   Jun. 14, 2018

(51) Int. Cl.
　　*A01F 7/06*　　　(2006.01)
　　*A01F 12/28*　　 (2006.01)
　　*A01F 12/20*　　 (2006.01)
　　*A01F 12/58*　　 (2006.01)

(52) U.S. Cl.
　　CPC .............. *A01F 7/062* (2013.01); *A01F 12/20* (2013.01); *A01F 12/58* (2013.01)

(58) Field of Classification Search
　　CPC ..... A01D 41/12; A01D 41/1271; A01F 7/067; A01F 12/10; A01F 12/442; A01F 12/28; A01F 12/24; A01F 7/06; A01F 7/062; A01F 12/20; A01F 12/58; A01F 12/18
　　USPC ....... 56/10.2 R, 11.8, 11.9, 14.6; 460/68–70, 460/108–110, 66
　　See application file for complete search history.

(56) References Cited

U.S. PATENT DOCUMENTS

| | | | | |
|---|---|---|---|---|
| 4,244,380 | A | * | 1/1981 | DePauw ................ A01F 7/067 460/108 |
| 4,258,726 | A | | 3/1981 | Glaser et al. |
| 8,231,446 | B2 | | 7/2012 | Pope et al. |
| 8,313,361 | B2 | | 11/2012 | Flickinger et al. |
| 8,540,559 | B1 | | 9/2013 | Flickinger et al. |
| 9,282,696 | B2 | * | 3/2016 | Regier ..................... A01F 12/28 |
| 9,788,491 | B2 | * | 10/2017 | Duquesne ............... A01F 12/18 |
| 2008/0207287 | A1 | * | 8/2008 | McKee ................... A01F 7/067 460/69 |
| 2011/0320087 | A1 | | 12/2011 | Farley et al. |

FOREIGN PATENT DOCUMENTS

| | | |
|---|---|---|
| DE | 20 2013 007 813 U1 | 11/2013 |
| EP | 1964464 A1 | 9/2008 |
| WO | 2014135648 A1 | 9/2014 |

OTHER PUBLICATIONS

European Search Report for European Application No. 17207415.5, dated May 15, 2018 (7 pages).

* cited by examiner

*Primary Examiner* — Robert E Pezzuto
(74) *Attorney, Agent, or Firm* — Peter K. Zacharias; Patrick M. Sheldrake

(57) ABSTRACT

A threshing and separating system for an agricultural vehicle includes: a rotor cage; a first vane rail movably connected to the rotor cage; a first vane portion pivotably connected to the rotor cage and linked to the first vane rail; a second vane rail movably connected to the rotor cage, the second vane rail being movable independently of the first vane rail; and a second vane portion pivotably connected to the rotor cage and linked to the second vane rail, the second vane portion and the first vane portion together defining a substantially continuous vane.

20 Claims, 8 Drawing Sheets

THRESHING AND SEPARATING SYSTEM WITH ADJUSTABLE ROTOR VANES

FIELD OF THE INVENTION

The present invention relates to agricultural vehicles, and, more particularly, to threshing systems of agricultural vehicles which include adjustable rotor vanes.

BACKGROUND OF THE INVENTION

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. The threshing rotor is provided with rasp bars that interact with the crop matter in order to further separate the grain from the crop matter, and to provide positive crop movement.

Once the grain is threshed it falls through perforations in the concaves and is transported to a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more threshing rotors which can extend axially (front to rear) or transversely within the body of the combine, and which are partially or fully surrounded by a perforated concave. Again, the one or more threshing rotors are provided with rasp bars that interact with the crop matter to separate grain and to provide positive crop movement. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto the grain pan where they are transported to the cleaning system. Alternatively, the grain and finer non-grain crop material may also fall directly onto the cleaning system itself.

The cleaning system further separates the grain from non-grain crop material, and typically includes a fan directing an air flow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the air flow stream, fall onto a surface of an upper sieve (also known as a chaffer sieve or sieve assembly) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve or sieve assembly are discharged at the rear of the combine. Grain falling through the lower sieve lands on a bottom pan of the cleaning system, where it is conveyed forwardly toward a clean grain auger. The clean grain auger is positioned below the lower sieve, and receives clean grain from each sieve and from the bottom pan of the cleaning system. The clean grain auger then augers the clean grain laterally sideways to a clean grain elevator, which in turn conveys the clean grain to a grain tank onboard the combine.

To move crop material through the threshing chamber, a rotor cage can be equipped with one or more vanes. The rotor vanes direct crop material flow through the threshing chamber as the rotor rotates so that crop material can flow across the length of the threshing chamber rather than simply tumbling within the threshing chamber. To control the speed at which crop material travels through the threshing chamber, the rotor vanes can have an adjustable pitch which allows a user to change how quickly crop material travels through the threshing chamber. An example of a threshing system with adjustable pitch vanes is described in U.S. Patent Application Publication No. 2011/0320087 to Farley et al. While adjustable pitch vanes have helped increase the throughput of the combine by controlling the speed of crop material travel through the threshing chamber, especially when harvesting under various crop conditions, power consumption and crop loss remain as ever-present concerns in combine harvesters.

What is needed in the art is a combine harvester which can overcome some of the previously described shortcomings of known combine harvesters.

SUMMARY OF THE INVENTION

In accordance with an aspect of the present invention, there is provided a threshing system with a first vane portion and a second vane portion which form a substantially continuous vane and are pivotable independently of one another.

In accordance with another aspect of the present invention, there is provided a threshing and separating system for an agricultural vehicle including: a rotor cage; a first vane rail movably connected to the rotor cage; a first vane portion pivotably connected to the rotor cage and linked to the first vane rail; a second vane rail movably connected to the rotor cage, the second vane rail being movable independently of the first vane rail; and a second vane portion pivotably connected to the rotor cage and linked to the second vane rail, the second vane portion and the first vane portion together defining a substantially continuous vane.

In accordance with yet another aspect of the present invention, there is provided an agricultural vehicle including a chassis and a threshing and separating system carried by the chassis. The threshing system includes: a rotor cage; a first vane rail movably connected to the rotor cage; a first vane portion pivotably connected to the rotor cage and linked to the first vane rail; a second vane rail movably connected to the rotor cage, the second vane rail being movable independently of the first vane rail; and a second vane portion pivotably connected to the rotor cage and linked to the second vane rail, the second vane portion and the first vane portion together defining a substantially continuous vane.

In accordance with yet another aspect of the present invention, there is provided a method of controlling a first vane portion and a second vane portion which together define a substantially continuous vane and are both pivotably connected to a rotor cage, which includes: moving a first vane rail connected to the rotor cage and linked to the first vane portion such that the first vane portion pivots responsively to movement of the first vane rail; and/or moving a second vane rail connected to the rotor cage and linked to the second vane portion such that the second vane portion pivots responsively to movement of the second vane rail, the second vane rail being movable independently of the first vane rail.

An advantage of the threshing system described herein is that an overall pitch of the formed vane can be more precisely controlled by independently controlling the first vane portion and the second vane portion.

Another advantage of the threshing system described herein is that it has been found that a leading end of a rotor vane has a significantly greater effect on combine loss performance and power consumption than a trailing end of the rotor vane; controlling two portions of a vane independently allows a user to better take advantage of this finding.

Still another advantage of the threshing system described herein is that similar adjustments of the pitch of the rotor vane can be achieved using smaller movements of the vane rails, which can reduce power requirements needed to adjust the vane portions.

BRIEF DESCRIPTION OF THE DRAWINGS

The above-mentioned and other features and advantages of this invention, and the manner of attaining them, will become more apparent and the invention will be better understood by reference to the following description of exemplary embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
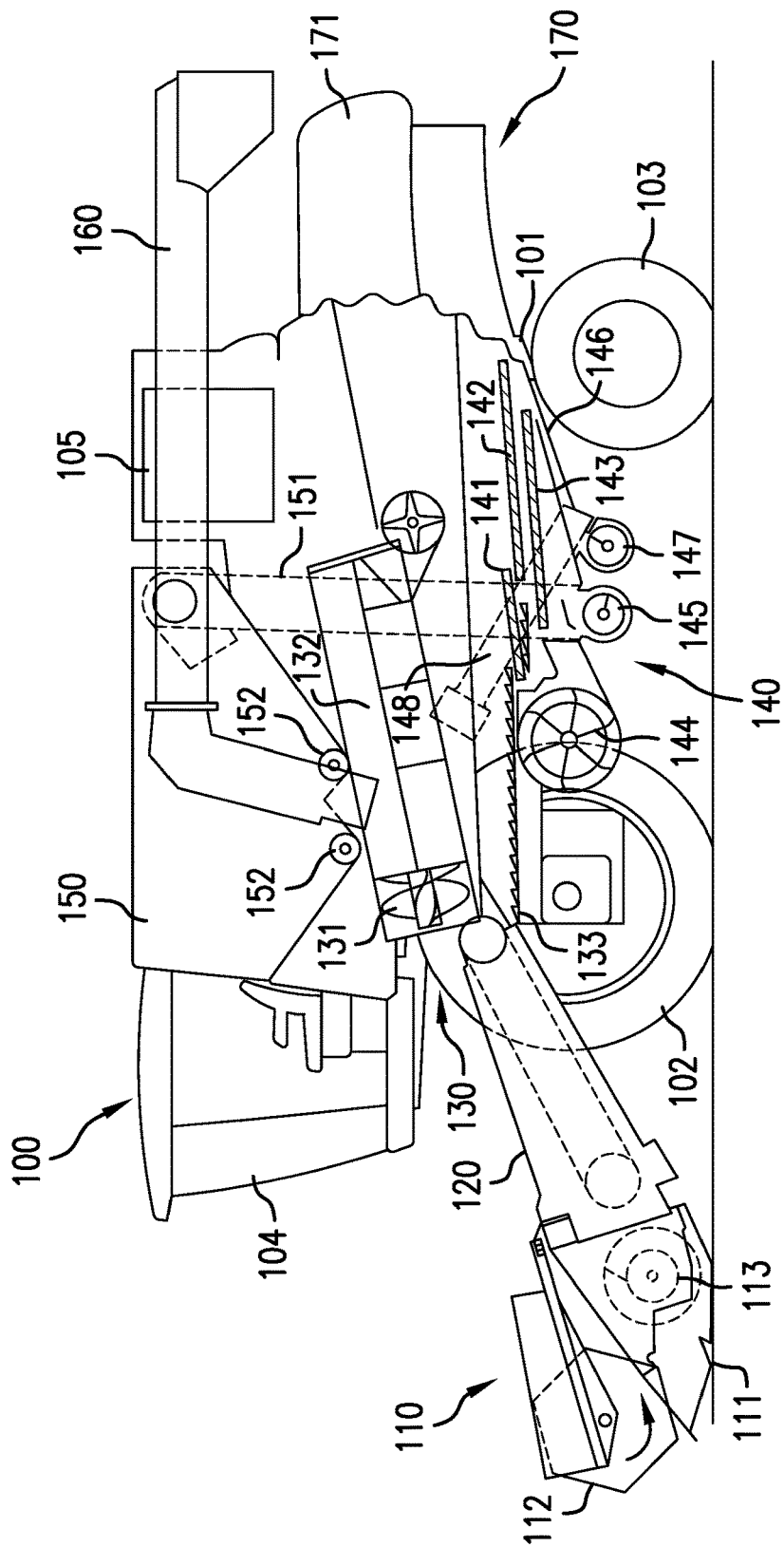
FIG. 1 is a side view of an agricultural vehicle in the form of a combine harvester, in accordance with an exemplary embodiment of the present invention.

Referring now to the drawings, and more particularly to FIG. 1, there is shown an exemplary embodiment of an agricultural harvester 100 in the form of a combine which generally includes a chassis 101, ground engaging wheels 102 and 103, header 110, feeder housing 120, operator cab 104, threshing and separating system 130, cleaning system 140, grain tank 150, and unloading conveyance 160. Front wheels 102 are larger flotation type wheels, and rear wheels 103 are smaller steerable wheels. Motive force is selectively applied to front wheels 102 through a power plant in the form of a diesel engine 105 and a transmission (not shown). Although combine 100 is shown as including wheels, is also to be understood that combine 100 may include tracks, such as full tracks or half tracks.

Header 110 is mounted to the front of combine 100 and includes a cutter bar 111 for severing crops from a field during forward motion of combine 100. A rotatable reel 112 feeds the crop into header 110, and a double auger 113 feeds the severed crop laterally inwardly from each side toward feeder housing 120. Feeder housing 120 conveys the cut crop to threshing and separating system 130, and is selectively vertically movable using appropriate actuators, such as hydraulic cylinders (not shown).

Threshing and separating system 130 is of the axial-flow type, and generally includes a threshing rotor 131 at least partially enclosed by a rotor cage (shown in FIG. 2) and rotatable within a corresponding perforated concave 132. The cut crops are threshed and separated by the rotation of rotor 131 within concave 132, and larger elements, such as stalks, leaves and the like are discharged from the rear of combine 100. Smaller elements of crop material including grain and non-grain crop material, including particles lighter than grain, such as chaff, dust and straw, are discharged through perforations of concave 132. Threshing and separating system 130 can also be a different type of system, such as a system with a transverse rotor rather than an axial rotor, etc.

Grain which has been separated by the threshing and separating assembly 130 falls onto a grain pan 133 and is conveyed toward cleaning system 140. Cleaning system 140 may include an optional pre-cleaning sieve 141, an upper sieve 142 (also known as a chaffer sieve or sieve assembly), a lower sieve 143 (also known as a cleaning sieve), and a cleaning fan 144. Grain on sieves 141, 142 and 143 is subjected to a cleaning action by fan 144 which provides an air flow through the sieves to remove chaff and other impurities such as dust from the grain by making this material airborne for discharge from a straw hood 171 of a residue handling system 170 of combine 100. Grain pan 133 and pre-cleaning sieve 141 oscillate in a fore-to-aft manner to transport the grain and finer non-grain crop material to the upper surface of upper sieve 142. Upper sieve 142 and lower sieve 143 are vertically arranged relative to each other, and likewise oscillate in a fore-to-aft manner to spread the grain across sieves 142, 143, while permitting the passage of cleaned grain by gravity through the openings of sieves 142, 143.

Clean grain falls to a clean grain auger 145 positioned crosswise below and toward the front of lower sieve 143. Clean grain auger 145 receives clean grain from each sieve 142, 143 and from a bottom pan 146 of cleaning system 140. Clean grain auger 145 conveys the clean grain laterally to a generally vertically arranged grain elevator 151 for transport to grain tank 150. Tailings from cleaning system 140 fall to a tailings auger trough 147. The tailings are transported via tailings auger 147 and return auger 148 to the upstream end of cleaning system 140 for repeated cleaning action. A pair of grain tank augers 152 at the bottom of grain tank 150 convey the clean grain laterally within grain tank 150 to unloading auger 160 for discharge from combine 100.

Figure 2:
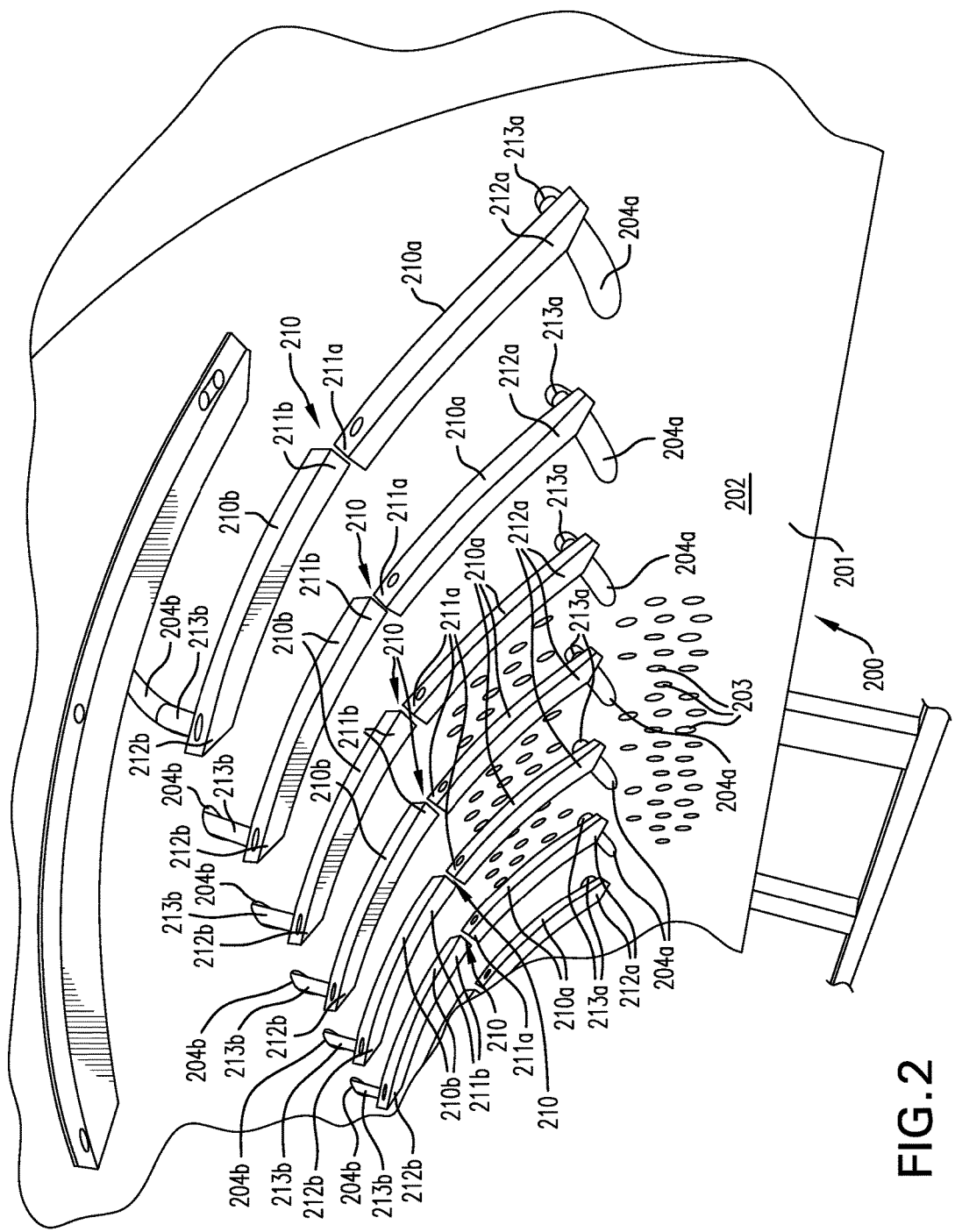
FIG. 2 is a perspective view of a rotor cage with pivotable first vane portions and second vane portions in accordance with an exemplary embodiment of the present invention.

Referring now to FIG. 2, an exemplary embodiment of a rotor cage 200 formed in accordance with one aspect of the present invention is shown. As can be seen, the rotor cage 200 can have a generally cylindrical cage body 201 with an interior surface 202 and an exterior surface (shown in FIG. 3). The cage body 201 can have a plurality of perforations 203 formed therein, as is known. A plurality of rotor vanes 210 can be placed within the interior of the rotor cage 200 to help direct crop material through the threshing and separating system 130 as the rotor 131 rotates.

Each rotor vane 210 has a first vane portion 210A and a second vane portion 210B, with the vane portions 210A and 210B together forming a substantially continuous rotor vane 210. As used herein, the rotor vanes 210 are "substantially continuous" in the sense that surfaces of the vane portions 210A and 210B provide a continuous flow path for crop material to flow against as the rotor 131 rotates, so that the crop material can flow across the entire length of the rotor vane 210 formed by the vane portions 210A and 210B. Each vane portion 210A and 210B can be formed to have a curved shape, and the vane portions 210A and 210B can be identically shaped or differently shaped, as desired. To form the continuous rotor vane 210, the first vane portion 210B can have a first end 211A which is pivotably connected to the cage body 201 and the second vane portion 210B can have a first end 211B which is also pivotably connected to the cage body 201, with the first ends 211A, 211B of the vane portions 210A, 210B abutting against one another. As the first ends 211A, 211B of the vane portions 210A, 210B are pivotably connected to the cage body 201, and thus define pivot axes of the respective vane portions 210A, 210B, the first ends 211A, 211B can be referred to as constrained ends, since the first ends 211A, 211B will not tend to experience any translational movement relative to the cage body 201. The vane portions 210A, 210B can also have respective movable ends 212A, 212B which can translate relative to the cage body 201, as described further herein.

The movable ends 212A, 212B of the vane portions 210A, 210B can each have a roll pin 213A, 213B connected thereto having a portion held in arcuate slots 204A, 204B formed in the cage body 201. The roll pins 213A, 213B being in the slots 204A, 204B allow pivoting of the vane portions 210A, 210B about the constrained ends 211A, 211B to be controlled so the vane portions 210A, 210B do not pivot to an undesired position, which will be described further herein. The roll pins 213A, 213B can also partially extend through the slots 204A, 204B to an exterior of the cage body 201, which will also be described further herein.

Figure 3:
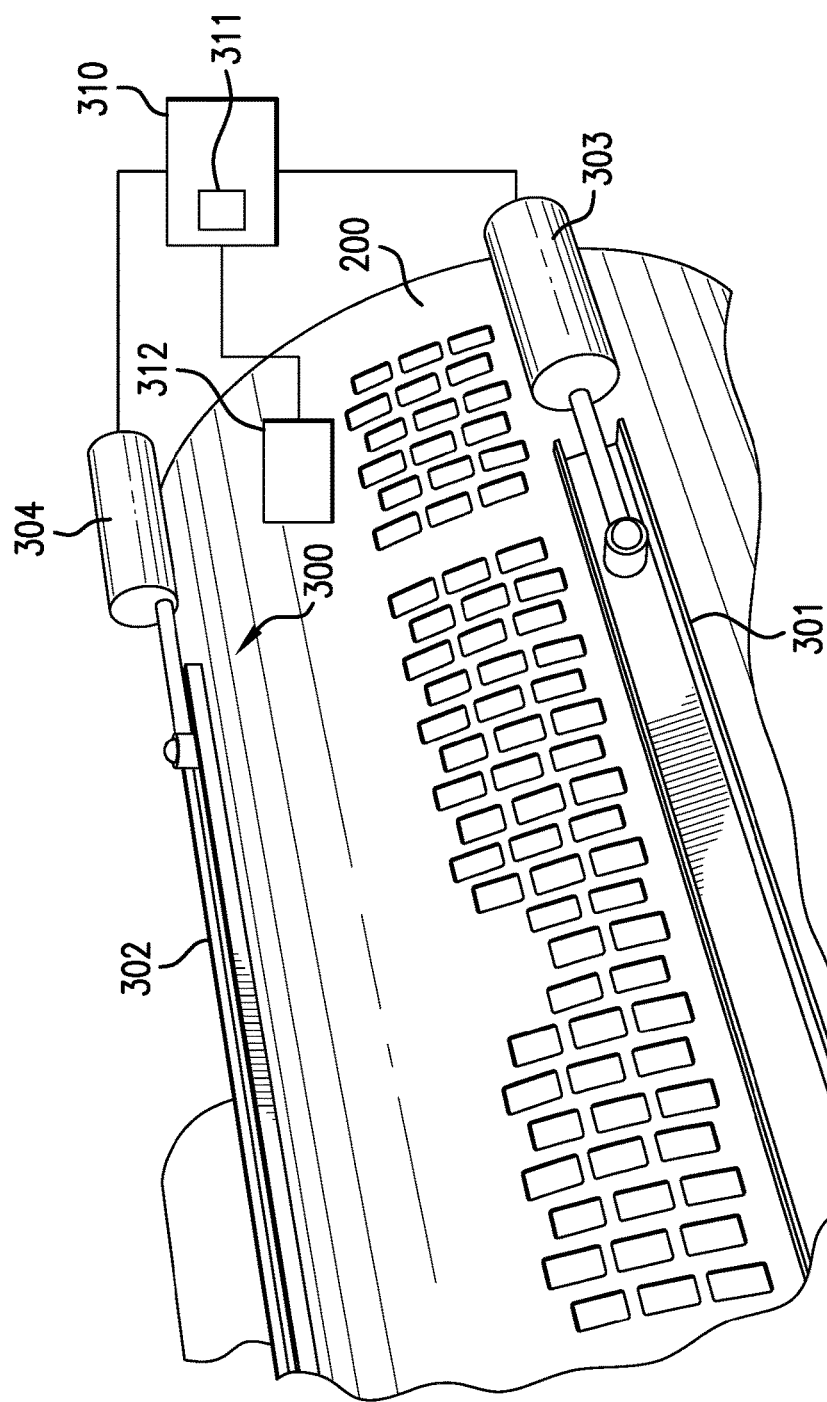
FIG. 3 is another perspective view of the rotor cage shown in FIG. 2 illustrating a first vane rail and a second vane rail in accordance with an exemplary embodiment of the present invention.

Referring now to FIG. 3, an exterior view of the rotor cage 200 is shown including a vane adjustment system 300 for adjusting the rotor vanes 210. As can be seen, the adjustment system 300 includes a first vane rail 301 which is linked to the movable ends 212A of the first vane portions 210A by the roll pins 213A and a second vane rail 302 which is linked to the movable ends 212B of the second vane portions 210B by the roll pins 213B. Both the first vane rail 301 and second vane rail 302 are movably connected to the rotor cage 200 such that the first vane rail 301 and second vane rail 302 can move, and thereby cause pivoting of a respectively connected vane portions 210A, 210B. As shown in FIG. 3, the rails 301 and 302 can be slideably mounted to the rotor cage 200 so the rails 301 and 302 can slide parallel to a longitudinal axis LA (shown in FIGS. 4-7) and cause pivoting of the respectively connected vane portions 210A, 210B, but it should be appreciated that the rails 301 and 302 can be movably connected to the rotor cage 200 in other ways that allow movement of the rails 301 and 302 to cause pivoting of the respectively connected vane portions 210A, 210B.

The first vane rail 301 and second vane rail 302 are movable independently of the other rail, i.e., the first vane rail 301 is not linked to the second vane rail 302 such that movement of the first vane rail 301 relative to the rotor cage 200 causes a corresponding movement of the second vane rail 302 relative to the rotor cage 200, and vice versa. By having the rails 301, 302 move independently of each other, the pivoting movement of the vane portions 210A, 210B can be independently controlled to finely tune the pitch of the formed rotor vanes 210, the significance of which will be described further herein. To move the first vane rail 301 and second vane rail 302 independently of each other, the adjustment system 300 can include a first actuator 303 which is linked to the first vane rail 301 and a second actuator 304 which is linked to the second vane rail 302, with the actuators 303, 304 being configured to move a respectively connected vane rail 301, 302. The actuators 303, 304 can be, for example, hydraulic or pneumatic cylinders or electric actuators. As shown in FIG. 3, the actuators 303, 304 are linear actuators configured to slide the vane rails 301, 302 parallel to the longitudinal axis LA, but it should be appreciated that the actuators 303, 304 can be configured in other ways to move the vane rails 301, 302, depending on how the vane rails 301, 302 are movably connected to the rotor cage 200. Further, it should be appreciated that the vane rails 301, 302 can be manually adjusted by an operator or otherwise, and do not require connection to an actuator for movement and corresponding pivoting of the vane portions 210A, 210B.

The adjustment system 300 can further include a controller 310 which is coupled to one or both actuators 303, 304 and is configured to selectively activate one or both of the actuators 303, 304. The controller 310 can be utilized by an operator in the operator cab 104 to monitor and control the operating parameters of the adjustment system 300. The controller 310 can be, for example, coupled to a touchscreen monitor (not shown) which the operator utilizes to send input signals to the controller 310 and control the actuators 303, 304 of the adjustment system 300. The controller 310 can include a memory unit 311 storing coded instructions for operating the adjustment system 300, as will be further described herein. The controller 310 can also monitor various operating parameters of the combine 100 by coupling to various sensors of the combine harvester 100, such as a crop throughput sensor 312, the significance of which will be described further herein.

Referring now to FIGS. 4-7, various possible operational orientations of the first vane portions 210A and second vane portions 210B are shown. In describing FIGS. 4-7, reference is made herein to a first pitch $\alpha 1$ of the first vane portions 210A and a second pitch $\alpha 2$ of the second vane portions 210B. As is known, a pitch, which can also be referred to as a pitch angle, of a vane refers to an angle formed between the vane and a longitudinal axis of the rotor cage. Therefore, reference to a "first pitch $\alpha 1$" refers to an angle formed between the first vane portions 210A and the longitudinal axis LA of the rotor cage 200 and reference to a "second pitch $\alpha 2$" refers to an angle formed between the second vane portions 210B and the longitudinal axis LA of the rotor cage 200. It can also be seen in FIGS. 4-7 how the constrained ends 211A, 211B of the vane portions 210A, 210B, which define pivot axes of the respective vane portions 210A, 210B, are offset from one another so that the vane portions 210A, 210B are always shingled properly as crop material transitions off the trailing end of the leading vane portions 210A and interacts with the leading end of the trailing vane portions 210B. The constrained ends 211A, 211B pivot about slots (not shown) which are positioned in such a way that this shingling effect is present regardless of the position of the movable ends 212A, 212B of the vane portions 210A, 210B in the respective arcuate slots 204A, 204B.

Figure 4:
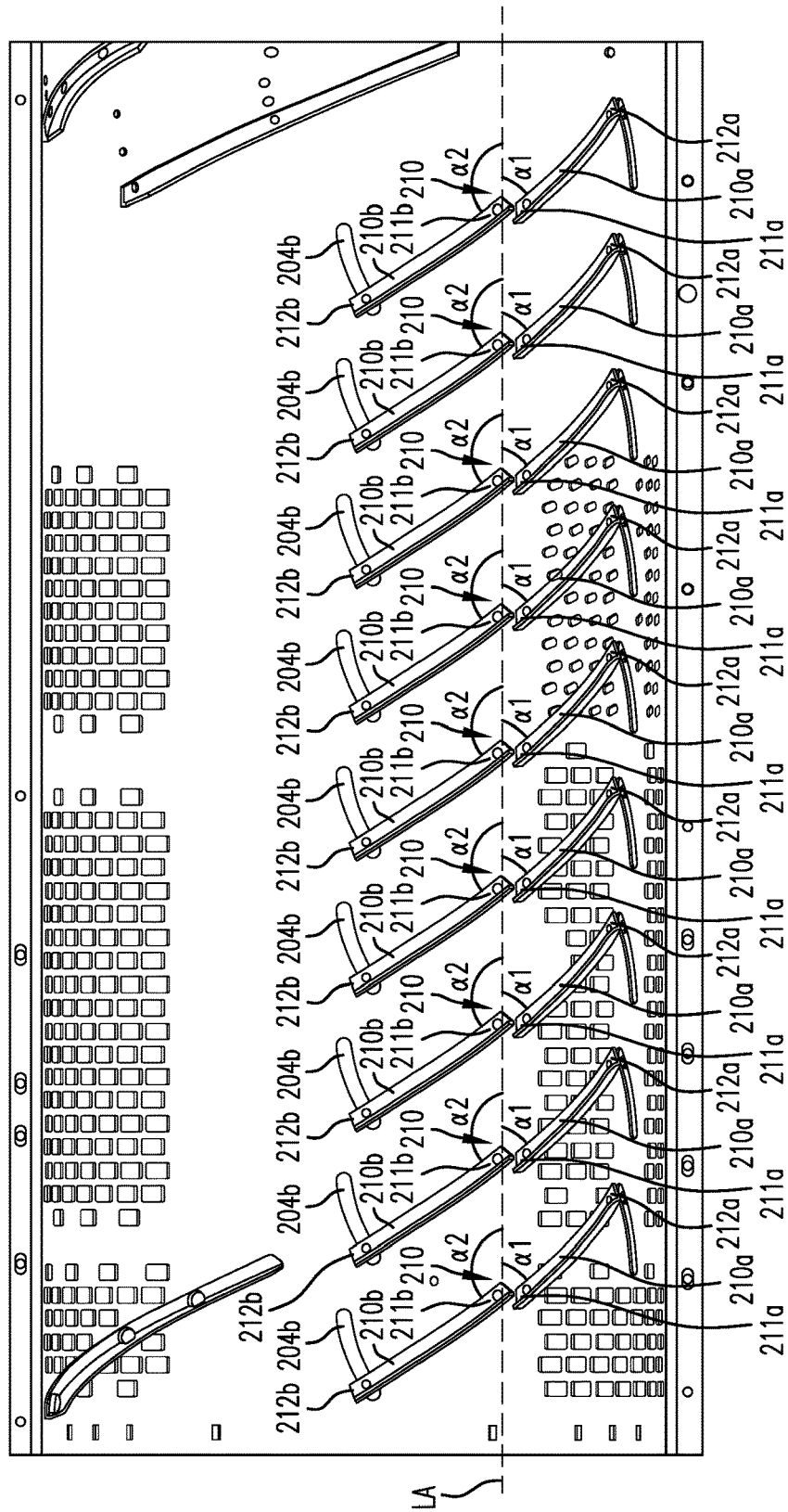
FIG. 4 is a perspective view of a possible orientation of the first vane portions and second vane portions shown in FIG. 2.

Referring specifically to FIG. 4, the first vane portions 210A and second vane portions 210B are all shown in a position corresponding to a fastest crop material flow through the rotor cage 200 as the rotor 131 rotates. In terms of pitch, the first pitch $\alpha 1$ of the first vane portions 210A, which can be referred to as leading vane portions, is at a minimum allowed value due to the shape of the arcuate slots 204A controlling pivoting of the first vane portions 210A, and the second pitch $\alpha 2$ of the second vane portions 210B, which can be referred to as trailing vane portions, is at a maximum allowed value due to the shape of the arcuate slots 204B controlling pivoting of the second vane portions 210B. By having the first pitch $\alpha 1$ at a minimum allowed value and the second pitch $\alpha 2$ at a maximum allowed value, the spiral shape assumed by the rotor vanes 210 can direct crop material in a direction parallel to the longitudinal axis LA to the maximum extent allowed by the arcuate slots 204A, 204B so crop material progresses through the rotor cage 200 parallel to the longitudinal axis LA as quickly as allowed. Thus, the first pitch $\alpha 1$ can be a "fast" pitch when it is a minimum allowed value and the second pitch $\alpha 2$ can be a "fast" pitch when it is at a maximum allowed value. It should therefore be appreciated that the arcuate slots 204A, 204B can be adjusted as desired to control the minimum allowed value of the first pitch $\alpha 1$ and the maximum allowed value of the second pitch $\alpha 2$ and therefore control the maximum allowed speed that crop material can progress through the rotor cage 200.

Figure 5:
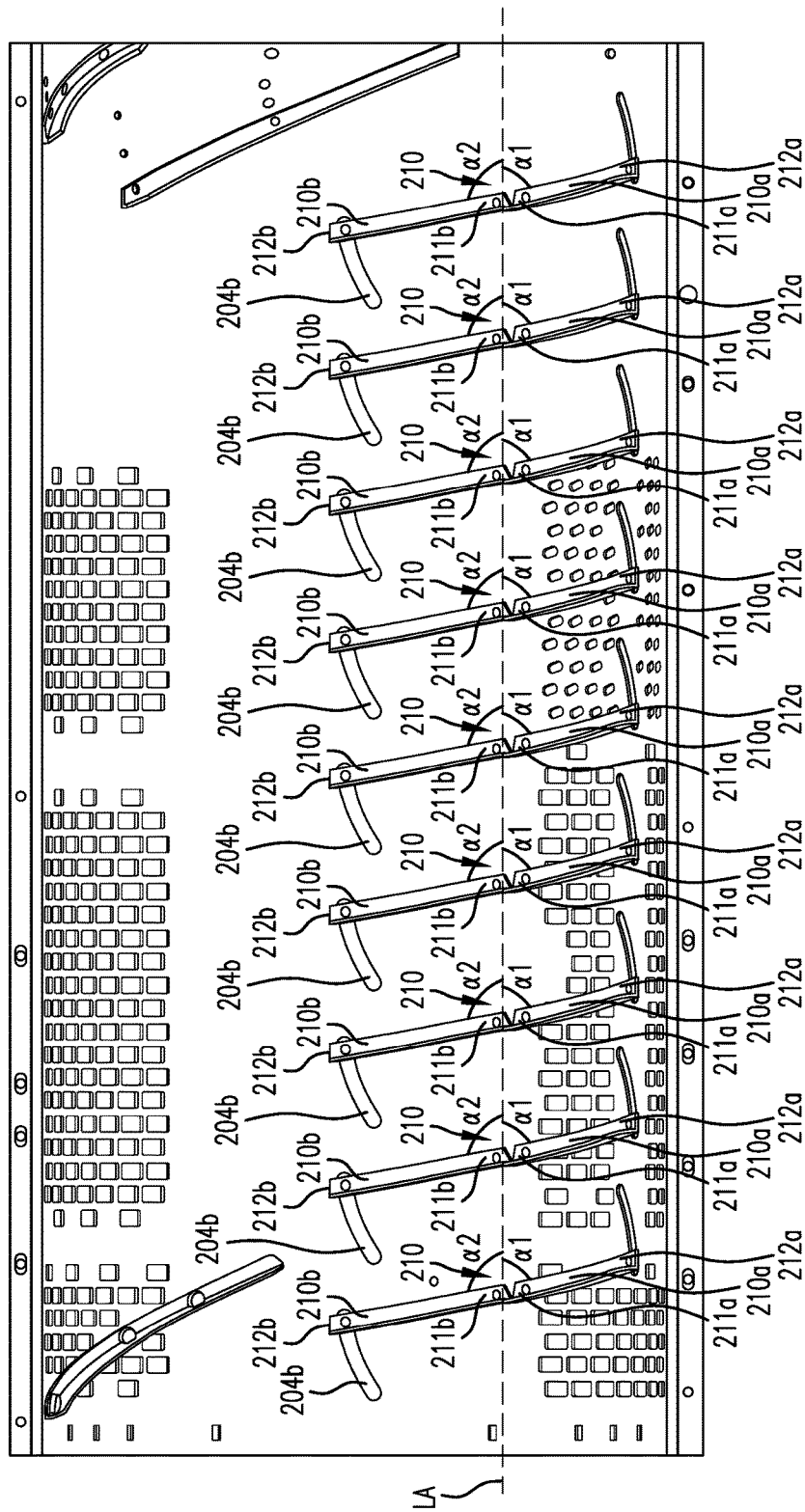
FIG. 5 is a perspective view of another possible orientation of the first vane portions and second vane portions shown in FIGS. 2 and 4.

Referring specifically now to FIG. 5, it can be seen that the first vane portions 210A and second vane portions 210B have been pivoted about their respective constrained ends 211A, 211B such that the first pitch $\alpha 1$ is at a maximum allowed value and the second pitch $\alpha 2$ is at a minimum allowed value. As shown in FIG. 5, the vane portions 210A and 210B have assumed orientations that produce a minimum allowed speed that crop material can progress through the rotor cage 200 parallel to the longitudinal axis LA as the rotor 131 rotates. As can be seen, the vane portions 210A, 210B together form rotor vanes 210 that are close to, but not quite, perpendicular to the longitudinal axis LA to produce the minimum allowed speed orientation. Thus, the first pitch $\alpha 1$ can be a "slow" pitch when it is a maximum allowed value and the second pitch $\alpha 2$ can be a "slow" pitch when it is at a minimum allowed value To switch the first vane portions 210A and second vane portions 210B from the orientation shown in FIG. 4 to the orientation shown in FIG. 5, the controller 310 can activate the actuators 303 and 304 to move a respectively connected vane rail 301, 302 so the respectively connected movable ends 212A, 212B translate relative to the rotor cage 200 and cause pivoting of the vane portions 210A, 210B about the respective constrained ends 211A, 211B, which define pivot axes of the vane portions 210A, 210B. Thus, the controller 310 can adjust the first pitch $\alpha 1$ and/or second pitch $\alpha 2$ of the first vane portions 210A and second vane portions 210B, respectively, by selectively activating the appropriate actuator 303, 304 to move the desired vane rail 301, 302.

In some situations, it may not be desired to have both vane portions 210A, 210B in orientations that produce either the maximum allowed speed or minimum allowed speed of crop material flow through the rotor cage 200. Particularly, it has been found that the leading end of a vane has a much greater effect on combine loss performance and power consumption than the trailing end. To take advantage of this principle, the leading vane portions 210A can be controlled so the first pitch $\alpha 1$ has a different relative effect on crop material flow speed through the rotor cage 200 than the second pitch $\alpha 2$ of the trailing vane portions 210B to desirably control crop material flow through the rotor cage 200 while reducing crop material loss and power consumption.

Figure 6:
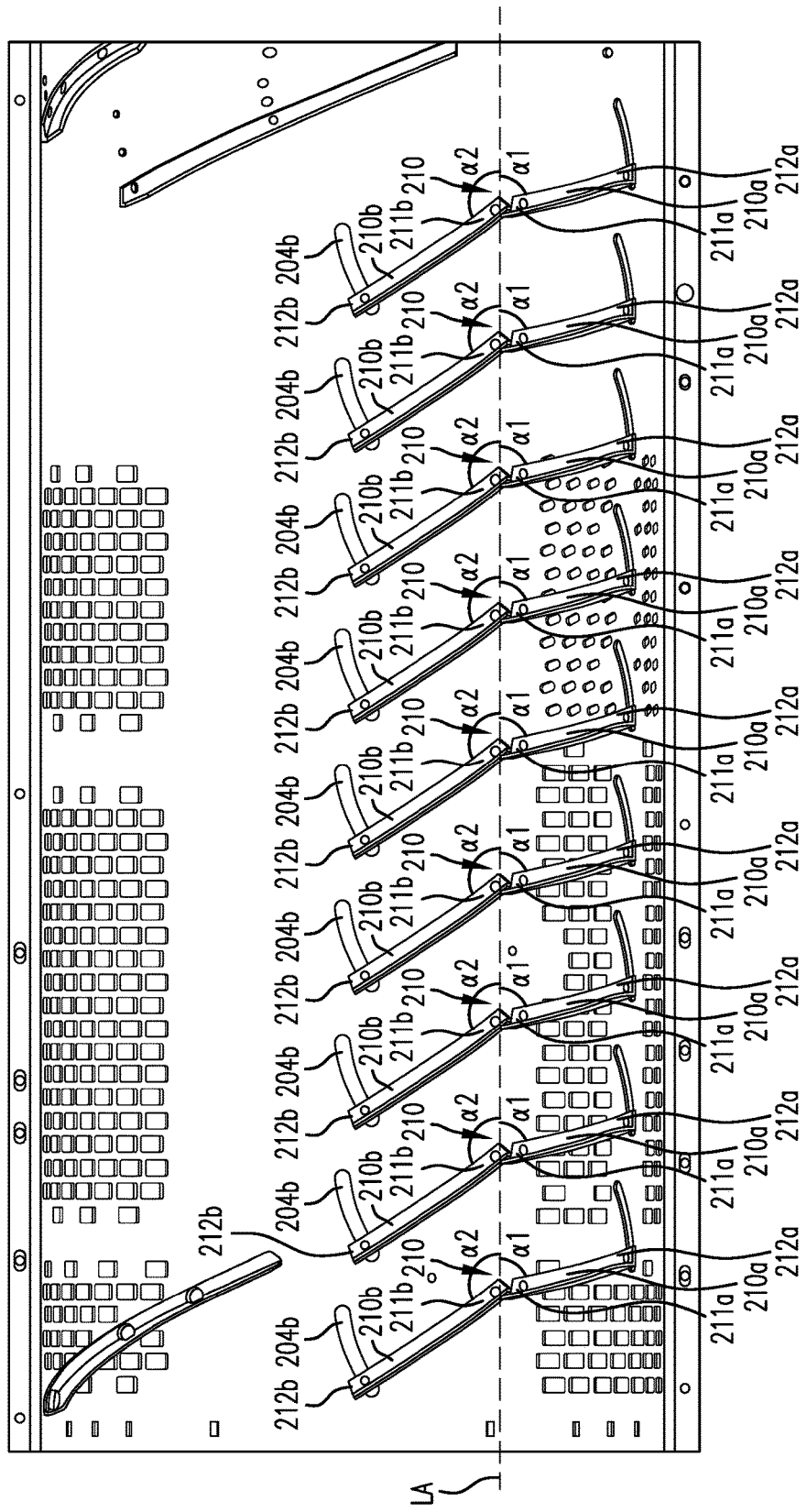
FIG. 6 is a perspective view of yet another possible orientation of the first vane portions and second vane portions shown in FIGS. 2 and 4-5.
Figure 7:
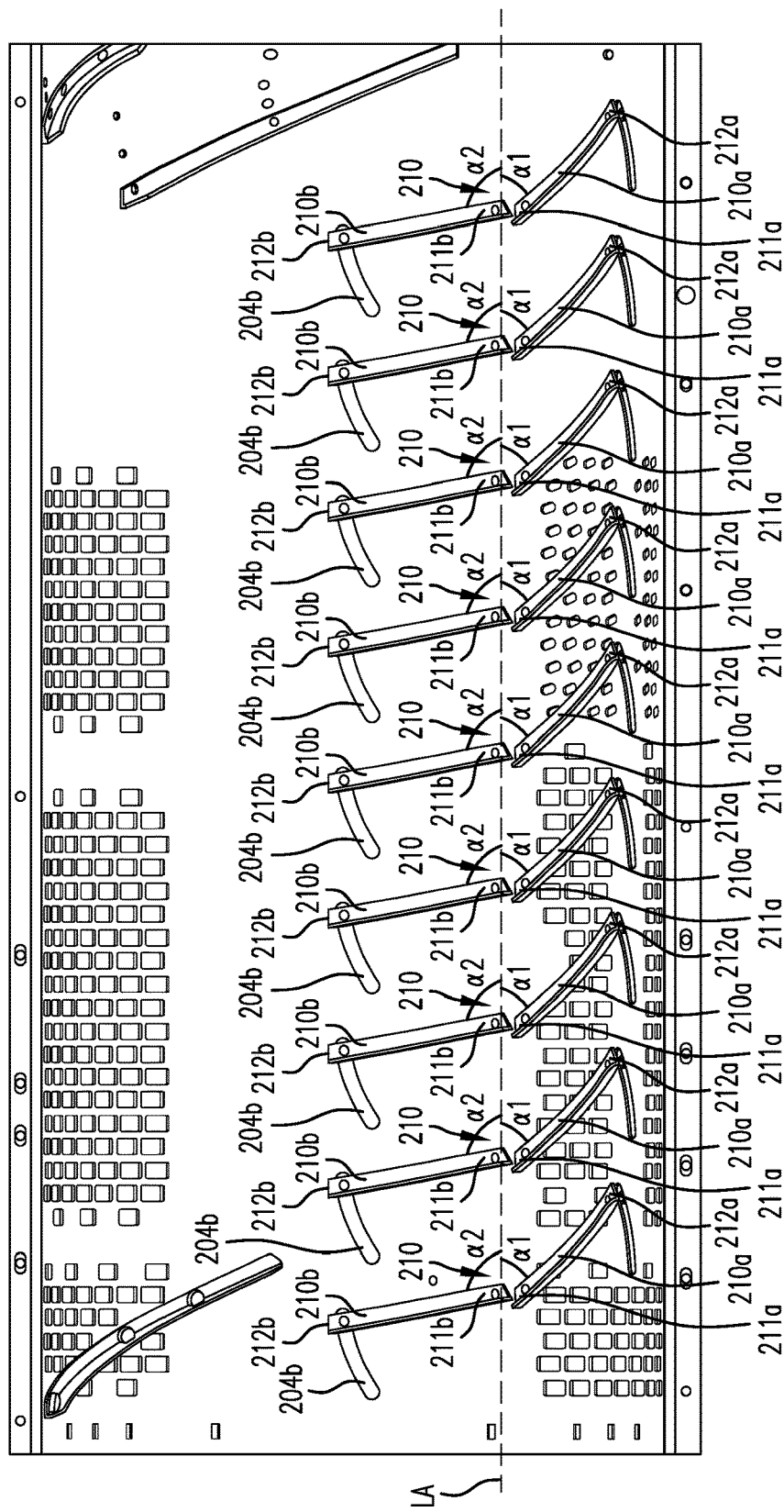
FIG. 7 is a perspective view of yet another possible orientation of the first vane portions and second vane portions shown in FIGS. 2 and 4-6.

Referring specifically now to FIG. 6, another possible orientation of the leading vane portions 210A and trailing vane portions 210B is shown in which the first pitch $\alpha 1$ of the leading vane portions 210A is at a maximum allowed value, corresponding to a slow pitch, and the second pitch $\alpha 2$ of the trailing vane portions 210B is also at a maximum allowed value, corresponding to a fast pitch. Conversely, and referring now to FIG. 7, another possible orientation of the leading vane portions 210A and trailing vane portions 210B is shown in which the first pitch $\alpha 1$ of the leading vane portions 210 is at a minimum allowed value, corresponding to a fast pitch, and the second pitch $\alpha 2$ of the trailing vane portions 210B is also at a minimum allowed value, corresponding to a slow pitch. By having the first pitch $\alpha 1$ of the leading vane portions 210A produce a relatively different effect on the crop material flow speed through the rotor cage 200 than the second pitch $\alpha 2$ of the trailing vane portions 210B, the crop material flow through the rotor cage 200 can be more precisely controlled in comparison to adjustable vanes which are a single portion. Further, independently controlling the leading vane portions 210A from the trailing vane portions 210B allows a user to take advantage of the observation that the leading vane portions 210A have a significantly greater effect on combine loss performance and power consumption than the trailing vane portions 210B.

Figure 8:
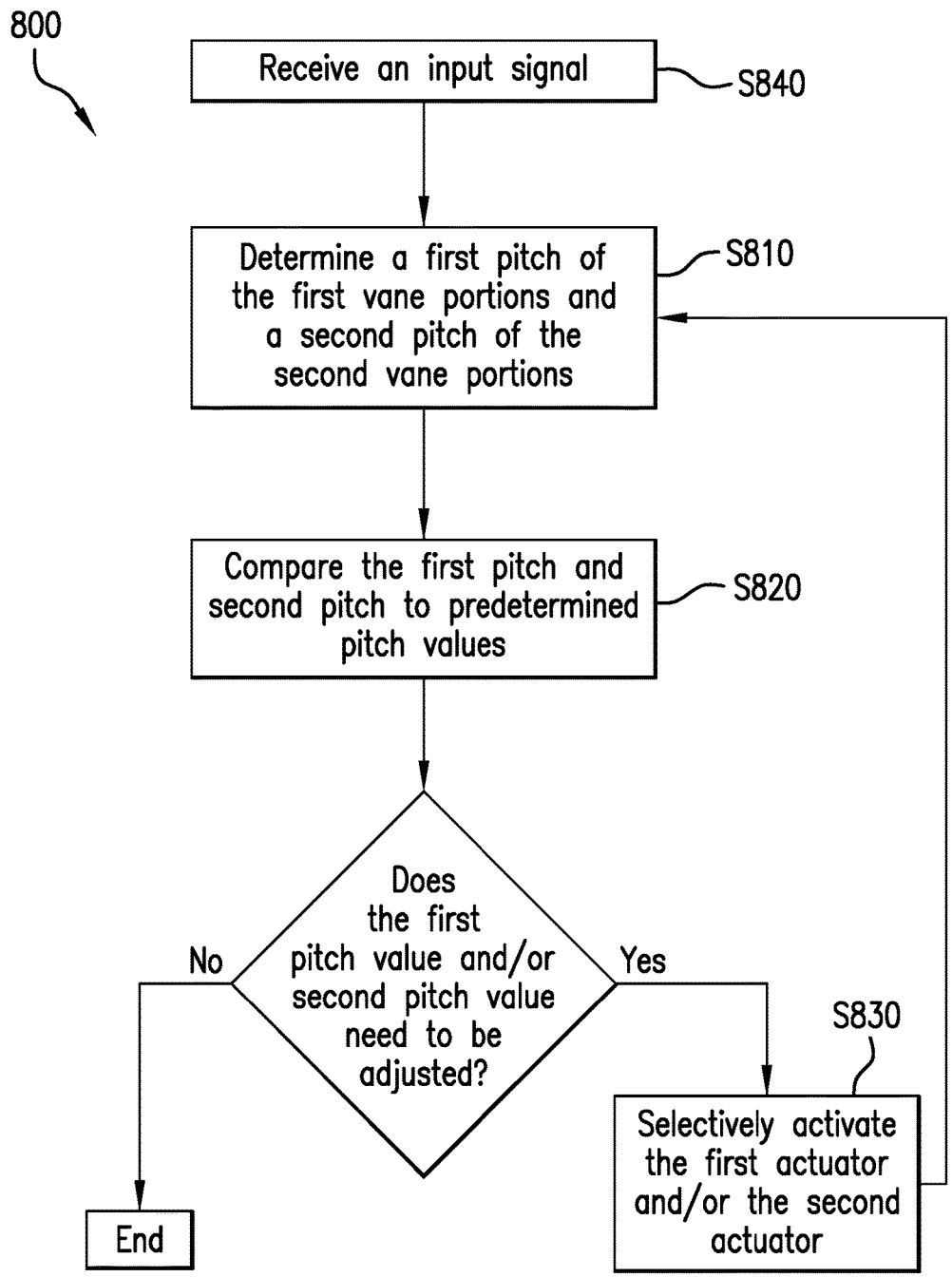
FIG. 8 is a flow chart illustrating a method in accordance with an exemplary embodiment of the present invention.

Referring now to FIG. 8, a flow chart illustrating an exemplary method 800 performed by the controller 310 in accordance with the present invention is shown. The controller 310 can determine S810 the first pitch $\alpha 1$ of the first (leading) vane portions 210A and the second pitch $\alpha 2$ of the second (trailing) vane portions 210B by, for example, determining an extension of the actuators 303, 304, which corresponds to an extension of the first vane rail 301 and second vane rail 302. The controller 310 can be configured to determine S810 the pitch values α1 and α2 when powering on or when instructed to, as further described herein. Upon determining S810 the first pitch α1 and second pitch α2, the controller 310 can compare S820 the first pitch α1 and second pitch α2 to predetermined pitch values which are stored in the memory 311 of the controller 310 to determine whether the first pitch α1 and/or second pitch α2 needs to be adjusted. The controller 310 can compare S820 the determined pitch values α1 and α2 to, for example, default values which are programmed into the memory 311 of the controller 310. If the first pitch α1 and/or second pitch α2 needs to be adjusted, the controller 310 can selectively activate S830 one or both actuators 303, 304 to adjust the first pitch α1 and/or second pitch α2 to the desired value. In the instance where both pitch values α1 and α2 must be adjusted, the controller 310 can selectively activate S830 both actuators 303, 304, with each actuator 303, 304 moving a respective vane rail 301, 302 independently of the other rail. In some cases, the controller 310 may only selectively activate S830 one of the actuators 303, 304 to move one of the vane rails 301, 302 in order to adjust a respective pitch α1 or α2 without moving the other vane rail.

The controller 310 can also be configured to receive S840 an input signal from, for example, a touchscreen (not shown) in the operator cab 104 corresponding to preprogrammed pitch values α1 and α2. For example, the operator may desire that the pitch values α1 and α2 be adjusted from the orientation shown in FIG. 4 to the orientation shown in FIG. 5, to slow down crop material flow through the rotor cage 200. To do so, the operator may select a button (not shown) on the touchscreen which sends an input signal to the controller 310, with the input signal received S840 by the controller 310 containing the desired pitch values α1 and α2 of the vane portions 810A and 810B. The controller 310 can then compare the determined pitch values α1 and α2 to the desired pitch values of the received input signal, and activate one or both actuators 303, 304 so the vane portions 810A and 810B assume the proper orientation. When the controller 310 senses that only one of the vane portions 810A, 810B needs to be moved, such as when going from the orientation shown in FIG. 4 to the orientation shown in FIG. 6, the controller 310 can be configured to only selectively activate S830 the appropriate actuator 303 to move the first rail vane 301 and pivot the leading vane portion 210A to the proper pitch α1 without activating the other actuator 304.

Optionally, the controller 310 can be configured to receive S840 an input signal from, for example, the previously described crop throughput sensor 312 and selectively activate S830 one or more actuators 303, 304 based on the received input signal. For example, the crop throughput sensor 312, which can be an optical sensor as known in the art, can be configured to send input signals to the controller 310 which indicate the speed at which crop material is flowing through the rotor cage 200. If the crop material is flowing through the rotor cage 200 at a speed which is greater than desired, the crop throughput sensor 312 can send an input signal to the controller 310 which is greater than a predetermined threshold value stored in the memory 311 of the controller 310. Responsively, the controller 310 can then selectively activate S830 one or both actuators 303, 304 to adjust the pitch value(s) α1 and/or α2 of the vane portion(s) 210A and/or 210B appropriately to slow down the speed at which crop material flows through the rotor cage 200. It should therefore be appreciated how the controller 310 can be utilized to control the actuators 303 and 304 in order to adjust the pitch values α1 and α2 of the vane portions 210A and 210B and control the crop material flow through the rotor cage 200.

It is to be understood that the steps of the method 800 is performed by its respective controller 310 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 310 described herein, such as the method 800, is implemented in software code or instructions which are tangibly stored on a tangible computer readable medium. Upon loading and executing such software code or instructions by the controller 310, the controller 310 may perform any of the functionality of the controller 310 described herein, including any steps of the method 800 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A threshing and separating system for an agricultural vehicle, comprising:
   a rotor cage;
   a first vane rail movably connected to said rotor cage;
   a first vane portion pivotably connected to said rotor cage and linked to said first vane rail;
   a second vane rail movably connected to said rotor cage, the first and second vane rails being both movable independently of each other; and
   a second vane portion pivotably connected to said rotor cage and linked to said second vane rail, said second vane portion and said first vane portion together defining a substantially continuous vane.

2. The threshing and separating system according to claim 1, further comprising:
   a first actuator linked to said first vane rail; and
   a second actuator linked to said second vane rail.

3. The threshing and separating system according to claim 2, further comprising a controller coupled to said first actuator and said second actuator, said controller being configured to selectively activate said first actuator and said second actuator.

4. The threshing and separating system according to claim 3, wherein said controller is configured to:
determine a first pitch of said first vane portion; and
determine a second pitch of said second vane portion.

5. The threshing and separating system according to claim 4, wherein said controller is configured to at least one of:
adjust said first pitch by activating said first actuator responsively to an input signal; and
adjust said second pitch by activating said second actuator responsively to an input signal.

6. The threshing and separating system according to claim 3, wherein said controller is configured to at least one of:
activate said first actuator responsively to an input signal without activating said second actuator; and
activate said second actuator responsively to an input signal without activating said first actuator.

7. The threshing and separating system according to claim 1, wherein said first vane portion has a first constrained end pivotably connected to said rotor cage and a first movable end linked to said first vane rail and said second vane portion has a second constrained end pivotably connected to said rotor cage and a second movable end linked to said second vane rail.

8. The threshing and separating system according to claim 7, wherein said first movable end of said first vane portion is guided within a first arcuate slot and said second movable end of said second vane portion is guided within a second arcuate slot.

9. An agricultural vehicle, comprising:
a chassis; and
a threshing and separating system carried by said chassis, said threshing and separating system including:
a rotor cage;
a first vane rail movably connected to said rotor cage;
a first vane portion pivotably connected to said rotor cage and linked to said first vane rail;
a second vane rail movably connected to said rotor cage, the first and second vane rails being both movable independently of each other; and
a second vane portion pivotably connected to said rotor cage and linked to said second vane rail, said second vane portion and said first vane portion together defining a substantially continuous vane.

10. The agricultural vehicle according to claim 9, further comprising:
a first actuator linked to said first vane rail; and
a second actuator linked to said second vane rail.

11. The agricultural vehicle according to claim 10, further comprising a controller coupled to said first actuator and said second actuator, said controller being configured to selectively activate said first actuator and said second actuator.

12. The agricultural vehicle according to claim 11, wherein said controller is configured to:
determine a first pitch of said first vane portion; and
determine a second pitch of said second vane portion.

13. The agricultural vehicle according to claim 12, wherein said controller is configured to at least one of:
adjust said first pitch by activating said first actuator responsively to an input signal; and
adjust said second pitch by activating said second actuator responsively to an input signal.

14. The agricultural vehicle according to claim 11, wherein said controller is configured to at least one of:
activate said first actuator responsively to an input signal without activating said second actuator; and
activate said second actuator responsively to an input signal without activating said first actuator.

15. The agricultural vehicle according to claim 9, wherein said first vane portion has a first constrained end pivotably connected to said rotor cage and a first movable end linked to said first vane rail and said second vane portion has a second constrained end pivotably connected to said rotor cage and a second movable end linked to said second vane rail.

16. The agricultural vehicle according to claim 15, wherein said first movable end of said first vane portion is guided within a first arcuate slot and said second movable end of said second vane portion is guided within a second arcuate slot.

17. A method of controlling a first vane portion and a second vane portion which together define a substantially continuous vane and are both pivotably connected to a rotor cage, comprising:
moving at least one of:
a first vane rail movably connected to said rotor cage and linked to said first vane portion such that said first vane portion pivots responsively to movement of said first vane rail; and
a second vane rail movably connected to said rotor cage and linked to said second vane portion such that said second vane portion pivots responsively to movement of said second vane rail, the first and second vane rails being both movable independently of each other.

18. The method according to claim 17, wherein at least one of said first vane rail is moved without moving said second vane rail and said second vane rail is moved without moving said first vane rail.

19. The method according to claim 17, further comprising:
determining a first pitch of said first vane portion;
determining a second pitch of said second vane portion; and
activating at least one of:
a first actuator to move said first vane rail responsively to said determined first pitch; and
a second actuator to move said second vane rail responsively to said determined second pitch.

20. The method according to claim 19, wherein said first actuator is activated without activating said second actuator or said second actuator is activated without activating said first actuator.

* * * * *